United States Patent
Igarashi et al.

(10) Patent No.: US 6,913,787 B2
(45) Date of Patent: Jul. 5, 2005

(54) COATING PARTICLES BY COLLIDING LARGER FLUIDIZED PARTICLES TO SMALLER SLURRY PARTICLES

(75) Inventors: Takahiro Igarashi, Kanagawa (JP); Tsuneo Kusunoki, Kanagawa (JP); Katsutoshi Ohno, Tokyo (JP)

(73) Assignee: Sony Corporation (JP)

( * ) Notice: Subject to any disclaimer, the term of this patent is extended or adjusted under 35 U.S.C. 154(b) by 103 days.

(21) Appl. No.: 10/463,532

(22) Filed: Jun. 18, 2003

(65) Prior Publication Data

US 2004/0043141 A1 Mar. 4, 2004

(30) Foreign Application Priority Data

Jun. 20, 2002 (JP) ..................................... P2002-180024

(51) Int. Cl.[7] .................................................. B05D 7/00
(52) U.S. Cl. ......................... 427/213; 427/71; 427/218
(58) Field of Search ........................ 427/71, 180, 185, 427/201, 213, 218, 215; 428/403; 252/351.4 R (56) References Cited

U.S. PATENT DOCUMENTS

| | | | | |
|---|---|---|---|---|
| 4,152,483 A | * | 5/1979 | Kanda et al. ............... | 428/403 |
| 4,172,920 A | * | 10/1979 | Kanda et al. ............... | 428/403 |
| 4,206,250 A | * | 6/1980 | Oba et al. .................. | 427/64 |
| 4,307,320 A | * | 12/1981 | Kotera et al. ............... | 313/474 |
| 4,473,634 A | * | 9/1984 | Dodds et al. .............. | 430/272.1 |
| 4,585,673 A | * | 4/1986 | Sigai .......................... | 427/213 |
| 4,684,540 A | * | 8/1987 | Schulze ........................ | 427/71 |
| 5,012,155 A | * | 4/1991 | Datta et al. .................. | 313/461 |
| 5,077,088 A | * | 12/1991 | Jeong ......................... | 427/218 |
| 5,246,781 A | * | 9/1993 | Jeong ......................... | 428/407 |
| 5,489,449 A | * | 2/1996 | Umeya et al. .............. | 427/450 |
| 5,874,135 A | * | 2/1999 | Yoon et al. .................. | 427/560 |
| 5,936,339 A | * | 8/1999 | Hayama et al. ............. | 313/461 |
| 5,962,082 A | * | 10/1999 | Hendrickson et al. ...... | 427/547 |
| 6,037,019 A | * | 3/2000 | Kooyer et al. .............. | 427/598 |
| 6,197,369 B1 | * | 3/2001 | Watano et al. .............. | 427/213 |

* cited by examiner

*Primary Examiner*—H. Thi Le
(74) *Attorney, Agent, or Firm*—Rader, Fishman & Grauer, PLLC; Ronald P. Kananen (57) ABSTRACT

This invention relates to coated particles used as phosphor particles for a phosphor screen of a display and a coating method for such particles. In the coating method of the present invention, first particles having a mean particle diameter of 3 to 10 μm are fluidized, and slurry drops obtained by suspending second particles having a mean particle diameter of 5 to 500 nm are generated from a spray nozzle or the like. Then, the fluidized first particles and the slurry drops are collided with each other, and thereby the second particles are coated on the surfaces of the first particles. Thereby, this invention is able to present coated particles wherein each surface of the first particles is uniformly coated with the second particles that are more microscopic than the first particles.

8 Claims, 6 Drawing Sheets

COATING PARTICLES BY COLLIDING LARGER FLUIDIZED PARTICLES TO SMALLER SLURRY PARTICLES

CROSS REFERENCE TO RELATED APPLICATIONS

The present document claims priority to Japanese Priority Document JP 2002-180024, filed in the Japanese Patent Office on Jun. 20, 2002, the entire contents of which are incorporated herein by reference to the extent permitted by law.

BACKGROUND OF THE INVENTION

1. Field of the Invention

This invention relates to coated particles and a coating method, and particularly to coated particles applied to a phosphor screen of a display as phosphor particles, and a method for forming such coated particles.

2. Description of Related Art

Recently, a display screen of a display apparatus and a cathode ray tube (hereinafter referred to as a CRT) have been promoted because of their flatness and large-size, and improvements in their resolution and image quality are expected.

For example, as is well-known, a CRT has a glass panel and a glass funnel that are integrally formed to be a tube, and an electron gun is provided inside the tube. Further, inside the panel of the tube, a color selection mechanism is provided, and an inner surface of the panel is formed to be a phosphor screen.

Black-colored, light absorption material film patterns made of carbon are formed on the inner surface of the panel as the phosphor screen. Among the light absorption material film patterns, a red pigment layer for transmitting red light, a green pigment layer for transmitting green light, and a blue pigment layer for transmitting blue light are formed in pattern respectively as color filters of red, green, and blue. Further, a red phosphor particle layer for emitting red light, a green phosphor particle layer for emitting a green light, and a blue phosphor particle layer for emitting a blue light are formed in pattern respectively on each of corresponding color pigment layers.

In such a CRT, an electron beam (cathode ray) emitted from an electron gun passes a color selection mechanism while being color-selected and excites the phosphor particles of each color at the red phosphor particle layer, the green phosphor particle layer, and the blue phosphor particle layer. Thus, the phosphor particles excited by the electron beam emit fluorescent light, and thereby a corresponding color image is displayed on an outer surface of the panel.

As a characteristic of a display apparatus, such as a CRT or the like, image quality is very important, and the contrast of the image determines the image quality. Colors of respective red, green, and blue phosphor particles provided on the phosphor screen are approximately white, and the reflection rate for external light at the phosphor screen of the panel is relatively high, so that this causes one of the reasons for decreasing the contrast of the display image. Accordingly, in order to increase the contrast, reflection of the external light is suppressed by providing color filters of red, green, and blue, as above mentioned.

However, in the cathode ray tube as configured above, it is necessary to form the pigment particle layers of each color before forming the phosphor particle layers on the inner surface of the panel in its fabrication process. This invites an increase in fabrication processes and a new investment for infrastructure in the case of in-line fabricating, so that it is not favorable.

Further as another method, it is known that pigment particles are directly coated on each surface of the phosphor particles in advance, and a layer of coated phosphor particles is formed on the phosphor screen. As one of the coating methods of applying the pigment particles to the surfaces of the phosphor particles, it is known that the phosphor particles and the pigment particles are dispersed in a dispersion medium, and then the pigment particles are fixed on each surface of the phosphor particles by adjusting the type of additive agent, their amount, and their pH. In this case, a mean particle diameter of the phosphor particles is around several $\mu$m, and a mean particle diameter of the pigment particles is around 100 to several 100 nm. Because the pigment particles are coated on each surface of the phosphor particles, the reflection of the external light is suppressed and improves the contrast of the display image.

In the case of the above mentioned coating method where the coating of the pigment particles to each surface of the phosphor particles is carried out in a liquid phase, it is necessary for the phosphor particles and the pigment particles to exist within the same liquid phase. Accordingly, an aggregation of particles tends to take place due to differences in zeta-potentials based on material differences, and it is very difficult to carry out a uniform coating. Further, there is the problem that the pigment particles exist non-uniformly on surfaces of the phosphor particles. If the pigment particles are non-uniformly coated on the surfaces of the phosphor particles, the emitting efficiency of the phosphor particles is decreased, and simultaneously, the reflection property of the phosphor particles is deteriorated. In the liquid phase where the phosphor particles and the pigment particles are mixed, the less a particle diameter becomes, the more the aggregation of particles occurs, so that it was practically impossible to use pigment particles having a particle diameter of less than 100 nm.

As described above, the method for coating more microscopic particles, such as pigment particles, on surfaces of microscopic particles, such as phosphor particles, has got a lot of attention as a surface property refining technology of particles, but the main stream is to use a liquid phase, so that it is difficult to carry out an uniform coating. Refining of the surface property of particles is very important technology. Technology for giving a new functionality to particles has wide application in various fields, such as the biological electronic materials fields, so that a method for uniformly coating the surfaces of microscopic particles with more microscopic particles is expected.

However, in the coated particles being coated with the pigment particles on each surface thereof by the above-mentioned conventional method, the pigment particles are likely to be peeled off the surfaces of the phosphor particles. Thus, there is a problem where the pigment particles peeled off from the surfaces of the phosphor particles are clogged in pipes of a fabrication apparatus during a phosphor screen fabrication process.

SUMMARY OF THE INVENTION

This invention was done in consideration of the above-mentioned problems, and the main aspect of the present invention is to present a method for uniformly coating surfaces of first particles with second particles that are more microscopic than the first particles. Further, this invention is to present coated particles that are formed by the method of the present invention, where each surface of the first particles are uniformly coated with the second particles that are more microscopic than the first particles.

The coating method of the present invention includes a step for fluidizing first particles having a first particle diameter, a step for generating slurry drops by suspending second particles having a second particle diameter that is smaller than the first particle diameter of the first particles, and a step for coating the second particles on surfaces of the first particles by colliding the fluidized first particles and the slurry drops of the second particles.

The coating method of the present invention fluidizes the first particles having a first particle diameter, generates slurry drops by suspending second particles having a second particle diameter that is smaller than a particle diameter of the first particles, and carries out the coating of the second particles on surfaces of the first particles by colliding the fluidized first particles and the slurry drops of the second particles.

In addition, in the coated particles for a display of the present invention, each surface of the first particles is coated with the second particles, wherein a mean particle diameter of the first particles is 3 to 10 μm and a mean particle diameter of the second particles is 5 to 100 nm.

In the coated particles for a display of the present invention, each surface of the first particles having a mean particle diameter of 3 to 10 μm is coated with the second particles having a mean particle diameter of 5 to 100 nm.

BRIEF DESCRIPTION OF THE DRAWINGS

In the accompanying drawings:

FIG. 2A to FIG. 2C are schematic diagrams showing a coating method related to the present embodiment, wherein

FIGS. 3A to 3C are schematic diagrams showing steps for coating surfaces of the first particles with the second particles, wherein

DETAILED DESCRIPTION OF THE PREFERRED EMBODIMENTS

Hereinafter, an embodiment of the present invention is explained with reference to the accompanying drawings.

The coating method related to the present embodiment is a method for coating surfaces of first particles having a first particle diameter by second particles having a second particle diameter that is smaller than the first particle diameter. In this case, the first particles are phosphor particles made of $Y_2O_2S:Eu$, for example, and the mean particle diameter thereof is 3 to 10 μm, for example. Further, the second particles are red pigment particles made of $Fe_2O_3$, or green pigment particles or blue pigment particles made of another composition, and the respective mean particle diameter is 5 to 500 nm, for example.

First, the coating method related to the present embodiment fluidizes the first particles having a first particle diameter. Next, slurry drops are formed by suspending the second particles having a second particle diameter. Then, the second particles are coated on each surface of the first particles by colliding the fluidized first particles and the slurry drops of the second particles.

Figure 1:
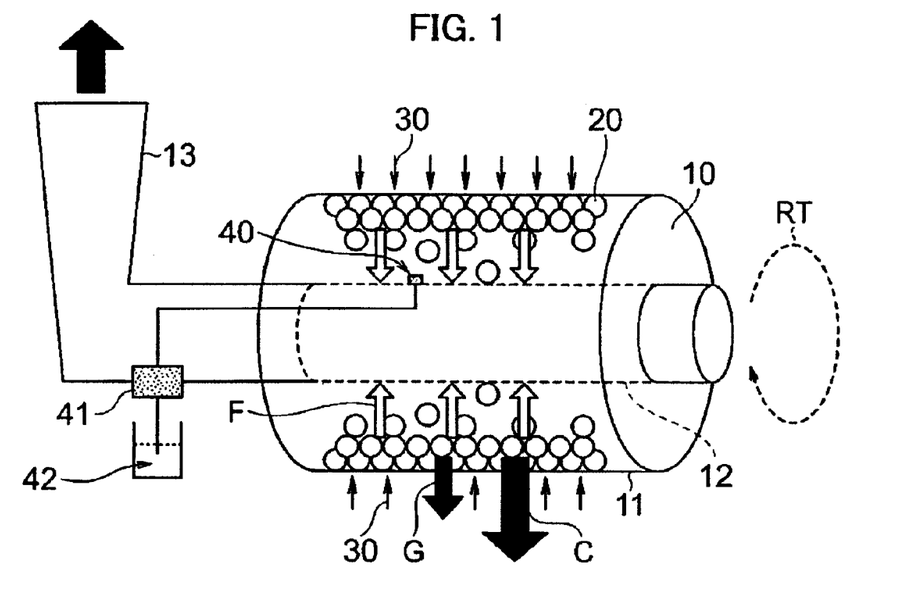
FIG. 1 is a schematic diagram of a centrifugal fluidization apparatus used in the present embodiment of this invention.

This embodiment employs a centrifugal fluidization method as a method for fluidizing particles. The centrifugal fluidization method is one of the methods for fluidizing particles by utilizing centrifugal forces. FIG. 1 is a schematic diagram of a centrifugal fluidization apparatus employed in the present embodiment of this invention. For example, a cylindrical container 10 having a diameter of 400 mm is rotated in a rotational direction RT while containing the first particles in inside. Further, fine apertures each having a diameter of 20 μm as provided on a side-wall 11 of the cylindrical container 10, and the apparatus is so configured to be able to blow a gas 30, such as air, into the cylindrical container 10 through those apertures. The gas 30 blown into the cylindrical container 10 is exhausted from an exhaust system 13 by way of a rotary axis 12 centered in the cylindrical container 10. In order to avoid a spurt of the first particles 20 to outside, there is provided a filter at any place from the rotary axis 12 to the exhaust system 13.

Further, near the rotary axis 12, a spray nozzle 40 is provided, and it is able to generate the slurry drops by blowing the slurry 42 of the second particles with a pump 41.

Now, the coating method for coating surfaces of the first particles with the second particles using a centrifugal fluidization apparatus is explained hereinafter. At first, the cylindrical container 10 is rotated in the rotational direction RT while containing a predetermined amount of the first particles, and a centrifugal force C that is larger than the gravitational force G is generated, so that the first particles 20 are fixed to an inner wall of the cylindrical container 10. Under this condition, an ascending force F is applied to the first particles 20 by blowing a gas 30, such as air, into inside of the cylindrical container 10 through apertures provided on a side-wall 11 of the cylindrical container 10, so that the first particles 20 are fluidized, accordingly. Then, the slurry drops are generated by spurting the slurry 42 of the second particles from the spray nozzle 40 by the pump 41, and the surfaces of the first particles 20 are coated with the second particles by colliding the first particles 20 and the slurry drops of the second particles.

Figure 2A:
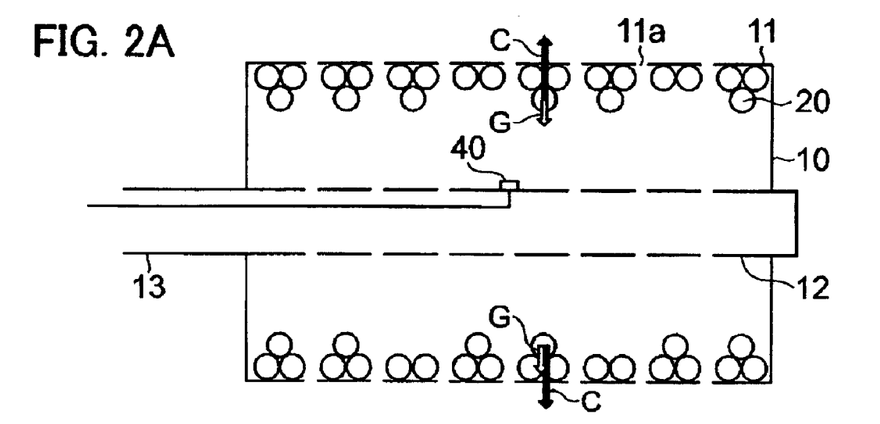
FIG. 2A shows a rotating step of a cylindrical container.
Figure 2B:
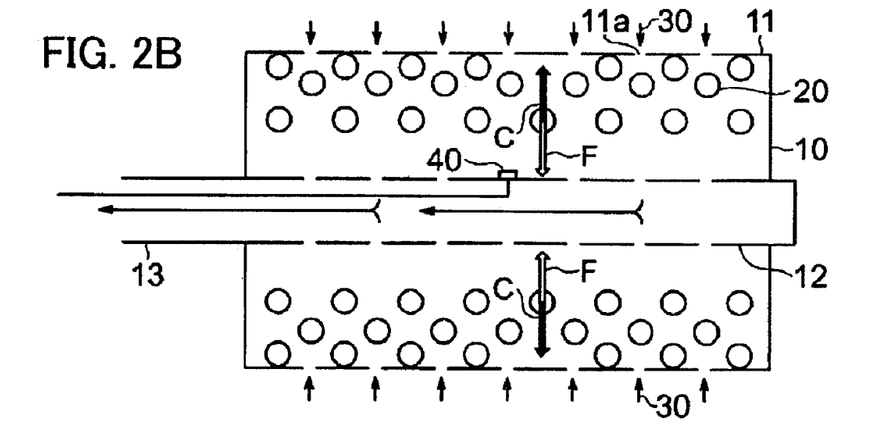
FIG. 2B shows a gas blowing step.
Figure 2C:
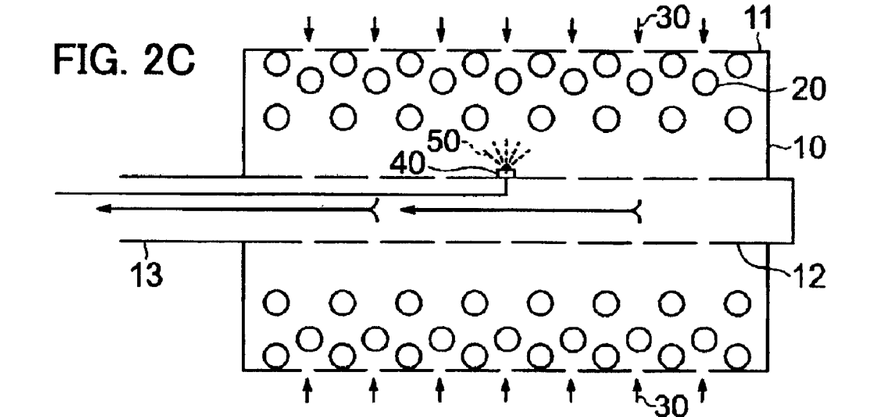
FIG. 2C shows a step for generating slurry drops of second particles.

FIGS. 2A to 2C are schematic diagrams for explaining the coating method of the present invention in more detail. When fluidizing the first particles at first, the first particles 20 are placed in a cylindrical container 10, and then the cylindrical container 10 is rotated to apply a gravitational force G to the first particles 20. In this case, a centrifugal force C larger than the gravitational force G acting on the first particles 20 is generated. Thereby, the first particles 20 are fixed to the inner wall of the cylindrical container 10.

A plurality of fine apertures 11a each having a diameter of around 20 μm as provided on a side-wall 11 of the cylindrical container 10. Next, as shown in FIG. 2B, while rotating the cylindrical container 10 as described above, the gas 30 is blown into the inside of the cylindrical container 10 through the apertures 11a on the side-wall 11 of the cylindrical container 10, and the ascending force F of the gas 30 is applied to the first particles 20. When the centrifugal force C generated by the rotation of the cylindrical container 10 and the ascending force F by the gas 30 are balanced, the first particles 20 are fluidized. Thus, the first particles 20 are fluidized by applying the centrifugal force C and then applying the ascending force F of the gas 30 in the direction of balancing with the centrifugal force C. The gas 30 blown into the cylindrical container 10 is exhausted from the exhaust system 13 through the central rotational axis 12 of the cylindrical container 10.

Next, as shown in FIG. 2C, while the first particles 20 are fluidized, the slurry drops 50 of the second particles are generated by blowing out the slurry of the second particles from the spray nozzle 40 provided near the rotational axis 12.

As a result, the fluidized first particles 20 and the slurry drops 50 of the second particles are collided to each other within the cylindrical container 10, and each surface of the first particles 20 is coated with the second particles.

Figure 3A:
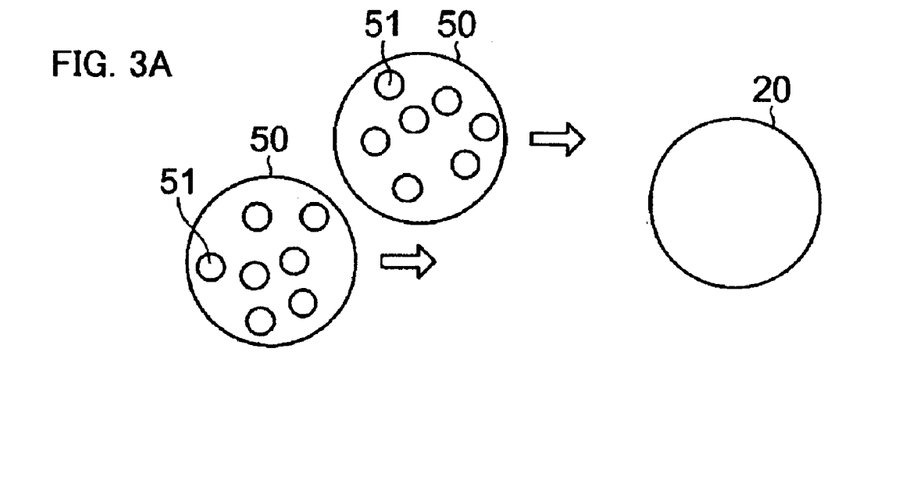
FIG. 3A shows a colliding step of the second particles to the first particles.
Figure 3B:
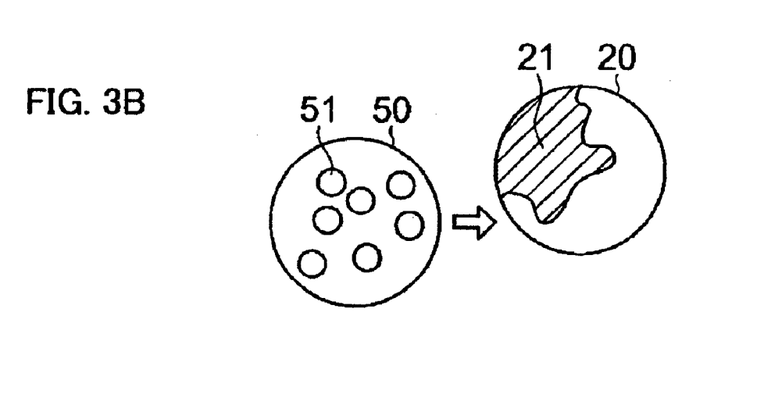
FIG. 3B shows a coating step where a portion of a surface of the first particle is coated.
Figure 3C:
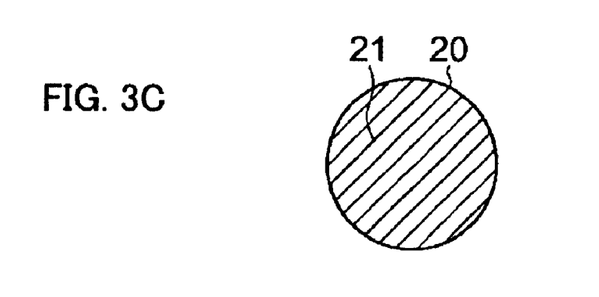
FIG. 3C shows a coating step where all of the surface of the first particle is coated.

FIGS. 3A to 3C are schematic diagrams for explaining in more detail the steps for coating the surfaces of the above first particles with the second particles in more detail. As shown in FIG. 3A, when the slurry drops 50 of the second particles 51 are collided to the first particles 20 at a predetermined speed, a part of the surface of the first particles 20 becomes a coated area coated with the second particles 51. A coated area 21 can be in a wet condition even when a dispersion medium such as water is included in the slurry, but when fluidized in the cylindrical container 10, the coated area 21 is rapidly dried, and the each surface of the first particles 20 is coated only by the second particles 51. By repeating the collision of the first particles 20 and the slurry drops 50 of the second particles 51, all the surfaces of the first particles 20 are coated by the second particles 51 and become the coated area 21, as shown in FIG. 3C.

In the coating method according to the present embodiment, the aggregation of the first particles 20 is suppressed by fluidizing the first particles 20 with centrifugal fluidization. On the contrary, the second particles 51 are changed to the slurry drops 50 while the aggregation of these is being suppressed. Accordingly, the first particles 20 and the second particles 51 are collided to each other while both of the aggregations are suppressed, so that each surface of the first particles 20 is uniformly coated with the second particles 51.

In the step for fluidizing the above first particles 20, it is preferable to rotate the cylindrical container 10 at a speed of 100 to 500 rpm, and particularly to around 300 rpm. Further, it is preferable to blow the gas with a pressure of 1 to 10 kPa, or preferably around 4.5 kPa, into the inside of the cylindrical container 10 through the apertures 115 provided on the sidewall 11 of the cylindrical container 10. Thereby, the method is able to fluidize adequately the first particles 20 by the balance between the centrifugal force of the rotation and the ascending force of the blow of gas 30. If the fluidization is fully applied to the first particles 20, it is able to carry out the coating uniformly while suppressing the aggregation of particles because agitation is fully done. On the contrary, if the fluidization is not enough, this causes a non-uniform coating due to the occurrence of aggregation of particles. Further, if the particles are aggregated, the collision speed of the first particles 20 and the slurry drops 50 of the second particles 51 is lowered, so that the adherence of the second particles 51 is reduced, or sometimes the case occurs where the second particles 51 are not adhered to the first particles 20.

In the coated particles related to the present embodiment, it is further preferable to select a mean particle diameter for the second particles from 5 to 100 nm. When the surfaces of the first particles are coated with the second particles according to the present embodiment, the aggregations of the first particles and the second particles are suppressed, so that the adhesive power of the second particles to the first particles is increased; and further, the second particles can be uniformly coated on the first particles by further breaking up the mean particle diameter of the second particles; and in this case, the adhesive power of the second particles to the first particles is able to be further increased as the atomic force becomes stronger because of the increase of the contact areas of the first particles and the second particles.

In addition, in the case of assigning an optical filter function to the second particles, such as pigment particles, if the particle diameter of the second particles is large, the quantity consumed for the second particles becomes large so as to obtain a predetermined optical characteristics, because of the effect of light scattering by the second particles. However, as mentioned above, it is possible to suppress the effect of light scattering by further breaking up the mean particle diameter of the second particles; and it is possible to obtain the predetermined optical characteristics with less amount.

Then, the surfaces of the phosphor particles, namely the first particles made of $Y_2O_2S:Eu$ were coated with the red pigment particles, namely the second particles made of $Fe_2O_3$. A mean particle diameter of the phosphor particles made of $Y_2O_2S:Eu$ employed in this example, was 6.5 μm, and a mean particle diameter of the red pigment particles made of $Fe_2O_3$ was 20 nm. The slurry density for the slurry of the second particles was set to be 17.7 wt. %.

At first, 2000 g of the phosphor particles were contained in a cylindrical container of the centrifugal fluidizing apparatus in FIG. 1, and the phosphor particles were fluidized by blowing air as a fluidizing gas at 4.5 kPa into the cylindrical container while rotating the cylindrical container at 295 rpm. Then, the slurry drops of the pigment particles were sprayed, into the cylindrical container while the phosphor particles were fluidized. In this case, the spray speed was 0.36 g/min. As the amount of use for the slurry of the pigment particles depended on the colored amount, there was no limitation for the spray amount. In this embodiment, totally, 35 gms of the slurry were sprayed in order to obtain predetermined optical characteristics, and the pigment particles were set to be around 0.3 wt. % relative to the phosphor particles. According to the coating method for coating the pigment particles to the surfaces of the phosphor particles as described above, a sample A was obtained by coating the pigment particles having a mean particle diameter of 20 nm on the surfaces of the phosphor particles having a mean particle diameter of 6.5 μm.

On the contrary, according to the conventional coating method for coating the pigment particles to the surfaces of the phosphor particles in the liquid phase, a sample B was obtained by coating the pigment particles having a mean particle diameter of larger than 100 nm on the surfaces of the phosphor particles having a mean particle diameter of 6.5 μm. In order to obtain predetermined optical characteristics, the pigment particles had to be around 1 to 2 wt. % relative to the phosphor particles, but the pigment particles were only around 0.3 wt. % relative to the phosphor particles, and the predetermined optical characteristics were not able to be obtained.

Figure 4:
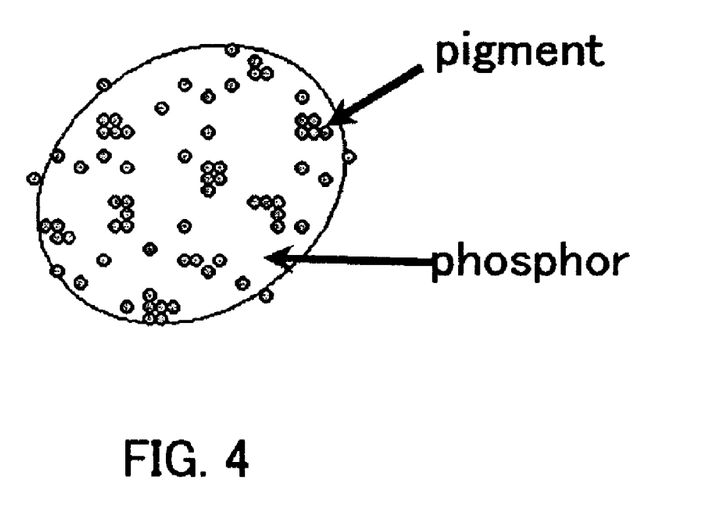
FIG. 4 is a schematic illustration of a photo of a surface of one conventional sample taken by a scan-type electron microscope.

FIG. 4 is a schematic illustration of an electron microscopic picture of the surface of the sample B relating to a conventional method. The existence of the $Fe_2O_3$ pigment particles was recognized on the phosphor particles.

Figure 5:
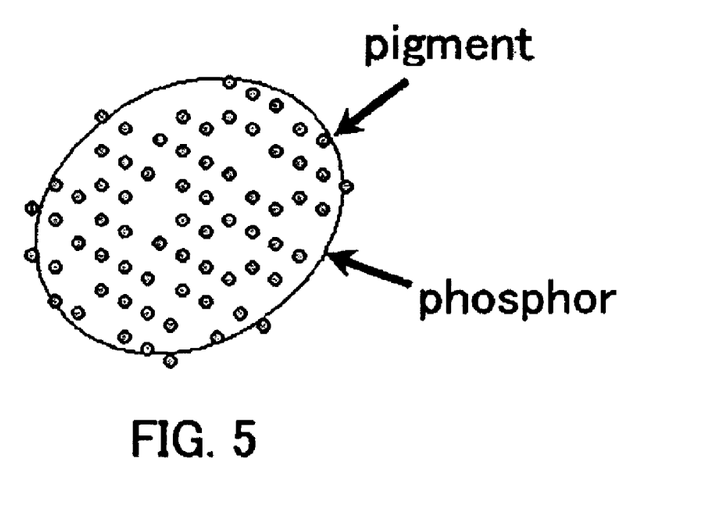
FIG. 5 is a schematic illustration of a photo of a surface of a sample according to the present invention taken by a scan-type electron microscope.

On the contrary, FIG. 5 shows a schematic illustration of an electron microscopic picture of a scan type for the surface of sample A according to the present invention, and it was taken with the same pace of expansion as in FIG. 4. In FIG. 5, the existence of the $Fe_2O_3$ pigment particles was not recognized on the surfaces of the phosphor particles.

Figure 6:
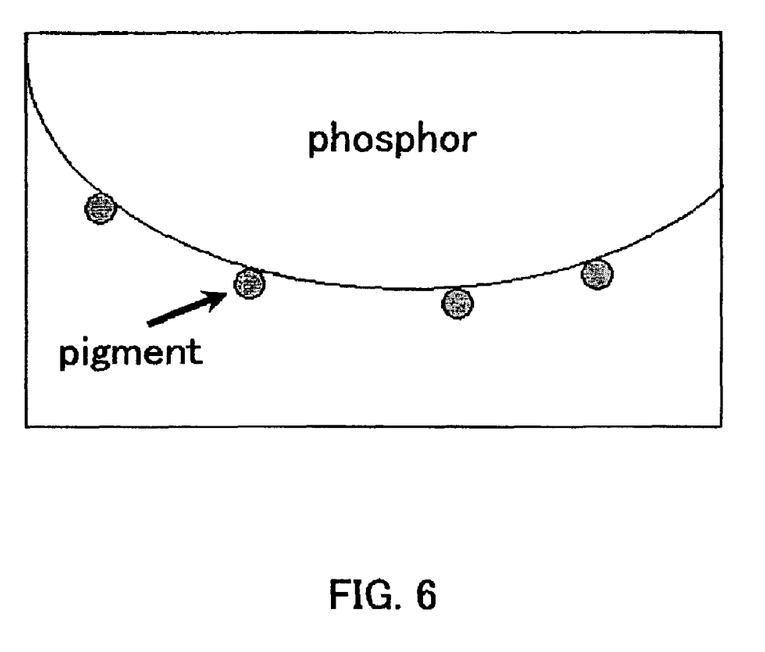
FIG. 6 is a schematic illustration of a picture of a sample according to the present invention taken by a transmission electron microscope with a larger pace of expansion than FIG. 5.

FIG. 6 shows a schematic illustration of a transmission electron microscopic picture for the surface of sample A according to the present invention, with a larger pace of expansion than in FIG. 5. The existence of $Fe_2O_3$ pigment particles each having a particle diameter of 20 to 50 nm was recognized at portions designated by an arrow to the phosphor particles designated with black shadows.

In a conventional method, the phosphor particles were non-uniformly coated, but it was recognized that the coating method of the present invention was able to uniformly coat the first particles.

Figure 7:
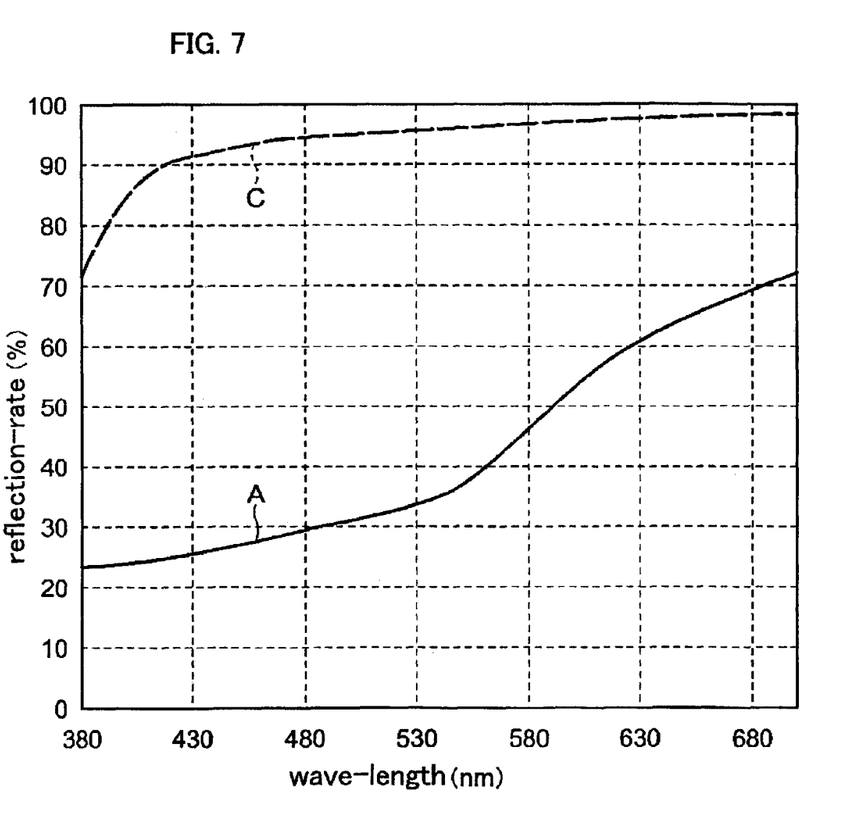
FIG. 7 is a reflection spectrum characteristic of the sample of the present invention.

Next, a reflection spectrum of the sample A relating to the present invention was measured. The result is shown in FIG. 7 with a solid line, where the ordinate is a reflection rate and the abscissa is a wave length. Further, a reflection spectrum of the sample C where the pigment particles are not coated to the phosphor particles is shown in FIG. 7 with a dotted line. In addition, a reflection spectrum of the sample C wherein the pigment particles are not coated on the surfaces of the phosphor particles is shown in FIG. 7 with a dotted line. When the reflection spectrum of the sample A is compared with that of the sample C, the reflection rate is generally reduced at the entire range of wave-length, but the reduction of the reflection rate at a shorter wave-length side is larger than the reduction of the reflection rate at a longer wave-length side. This fact indicates that the phosphor particles are colored in red with the pigment particles.

As is clear from the above, the coating method of the present embodiment is able to uniformly coat the surfaces of the first particles with the second particles that are finer than the first particles. In addition, the amount of water used is less as compared with a conventional method, so that the influence on an environment also is small.

Further, the coated particles of the present invention are formed by the above mentioned coating method of the present invention, and the surfaces of the first particles are coated to be hard so as to be peeled off with the second particles that are finer than the first particles.

As the coated particles related to the present embodiment, the phosphor particles each surface of which is coated with the pigment particles, are able to be applied to an illuminant layer in a phosphor screen of a CRT. For example, in a CRT, an electron gun is provided inside of a glass tube body comprising integrally formed a panel and a funnel, and inside of the panel, there is provided a color selection mechanism, and further, a surface of an inner face of the panel is configured to be a phosphor screen. A black-colored film pattern of light absorption material, such as carbon, is formed on the inner face of the panel as the phosphor screen, and between the light absorption material film pattern, a red phosphor particle layer for emitting red light, a green phosphor particle layer for emitting green light, and a blue phosphor particle layer for emitting blue light are formed in pattern, each layer of which is coated with respective red, green, and blue pigment particles.

In the CRT as above configured, an electron beam (cathode ray) emitted from the electron gun passes through the color-selection mechanism while being color-selected, and excites respective phosphor particle in the red phosphor particle layer, the green phosphor particle layer, and the blue phosphor particle layer. Each phosphor particle excited by the electron beam emits respective fluorescent lights of red, green, and blue, and thereby a color image can be displayed on an outer surface of the panel. In this case, the pigment particles are coated on each surface of the phosphor particles, so that the reflection of external light is suppressed, and accordingly, it becomes possible to improve the contrast of the display image.

This invention is not limited to the above-mentioned embodiment. For example, according to the present embodiment, a centrifugal fluidization is employed for fluidizing the first particles, but another fluidizing method may be employed. Further, in the above embodiment and the example, phosphor particles made of $Y_2O_2S:Eu$ as the first particles and red pigment particles made of $Fe_2O_3$ as the second particles are exemplified, but they are not limited to this, and this invention is able to be applied to various illuminant particles, such as for exciting other electron beams or an UV ray, and to pigment particles other than the red pigment particles made of $Fe_2O_3$. Further, this invention is able to be applied to particles other than phosphor particles and pigment particles as the first particles and the second particles and to contribute to change the surface property of the first particles by the second particles. Further, it is possible to apply changes within the scope of the present invention.

What is claimed is:

1. A coating method comprising:
   a step of fluidizing first particles substantially having a first particle diameter;
   a step of providing slurry drops obtained by suspending second particles substantially having a second particle diameter that is smaller than said first particle diameter; and
   a step of coating said second particles on each surface of said first particles by colliding said fluidized first particles and said slurry drops of said second particles.

2. The coating method as cited in claim 1, wherein
   said first particles are phosphor particles and said second particles are pigment particles.

3. The coating method as cited in claim 2, wherein
   said second particles are one of red pigment particles, green pigment particles, and blue pigment particles.

4. The coating method as cited in claim 1, wherein
   a mean particle diameter of said first particles is 3 to 10 μm, and
   a mean particle diameter of said second particles is 5 to 500 nm.

5. The coating method as cited in claim 1, wherein
   a mean particle diameter of said first particles is 3 to 10 μm, and
   a mean particle diameter of said second particles is 5 to 100 nm.

6. The coating method as cited in claim 1, wherein
   said first particles are fluidized by acting a centrifugal force and an ascending force by a gas acting to balance with said centrifugal force to said first particles at said fluidizing step.

7. The coating method as cited in claim 6, wherein
   a cylindrical container is rotated for acting said centrifugal force to said first particles while carrying said first particles, and a gas is blown inside of said cylindrical container through holes provided on a side-wall of the cylindrical container for acting buoyant force to said first particles by said gas at said fluidizing step.

8. The coating method as cited in claim 7, wherein
   said cylindrical container is rotated at 100 to 500 rpm, and said gas is blown inside of said cylindrical container through said holes provided on said side-wall of the cylindrical container with a pressure of 1 to 10 kPa at said fluidizing step.

* * * * *